United States Patent
Lee

(10) Patent No.: US 12,318,735 B2
(45) Date of Patent: Jun. 3, 2025

(54) REVERSE OSMOSIS MEMBRANE AND METHOD FOR MANUFACTURING SAME

(71) Applicant: Toray Advanced Materials Korea Inc., Gyeongsangbuk-do (KR)

(72) Inventor: Dae Won Lee, Gyeongsangbuk-do (KR)

(73) Assignee: TORAY ADVANCED MATERIALS KOREA INC., Gyeongsangbuk-Do (KR)

( * ) Notice: Subject to any disclaimer, the term of this patent is extended or adjusted under 35 U.S.C. 154(b) by 537 days.

(21) Appl. No.: 17/761,146

(22) PCT Filed: Aug. 20, 2020

(86) PCT No.: PCT/KR2020/011114
§ 371 (c)(1),
(2) Date: Mar. 16, 2022

(87) PCT Pub. No.: WO2021/054626
PCT Pub. Date: Mar. 25, 2021

(65) Prior Publication Data
US 2023/0347298 A1  Nov. 2, 2023

(30) Foreign Application Priority Data

Sep. 18, 2019 (KR) .......................... 10-2019-0114818

(51) Int. Cl.
B01D 69/12 (2006.01)
B01D 61/02 (2006.01)
(Continued)

(52) U.S. Cl.
CPC ......... B01D 69/105 (2013.01); B01D 61/025 (2013.01); B01D 67/0013 (2013.01);
(Continued)

(58) Field of Classification Search
CPC ................ B01D 69/105; B01D 61/025; B01D 67/0013; B01D 67/0095; B01D 69/02;
(Continued)

(56) References Cited

U.S. PATENT DOCUMENTS

| 5,425,877 A | 6/1995 | Knappe |
| 7,138,058 B2 | 11/2006 | Kurth et al. |

(Continued)

FOREIGN PATENT DOCUMENTS

| CN | 1676203 | 10/2005 |
| CN | 102715170 | 10/2012 |

(Continued)

OTHER PUBLICATIONS

English Machine Translation of KR20140138651A (Year: 2014).*

(Continued)

*Primary Examiner* — Madeline Gonzalez
(74) *Attorney, Agent, or Firm* — MORRISON & FOERSTER LLP

(57) ABSTRACT

The present invention relates to a reverse osmosis membrane and a method of preparing the same, and more particularly to a high durability reverse osmosis membrane which is excellent in interlayer bonding in a separation membrane while maintaining an equal flow rate as compared with a conventional reverse osmosis membrane to minimize a reduction in durability in the membrane upon backwashing to enhance a cleaning effect, prolong the life of a high-pressure membrane, maximize the amount of accumulated treated water, and reduce maintenance costs, and a method of preparing the same.

1 Claim, 2 Drawing Sheets

(51) Int. Cl.
   *B01D 67/00* (2006.01)
   *B01D 69/02* (2006.01)
   *B01D 69/10* (2006.01)
   *B01D 71/48* (2006.01)
(52) U.S. Cl.
   CPC ......... *B01D 67/0095* (2013.01); *B01D 69/02* (2013.01); *B01D 69/107* (2022.08); *B01D 69/1071* (2022.08); *B01D 69/1216* (2022.08); *B01D 71/48* (2013.01); *B01D 2323/02* (2013.01); *B01D 2323/081* (2022.08); *B01D 2325/24* (2013.01); *B01D 2325/36* (2013.01)
(58) Field of Classification Search
   CPC .............. B01D 69/107; B01D 69/1071; B01D 69/1216; B01D 71/48; B01D 2323/02; B01D 2323/081; B01D 2325/24; B01D 2325/36; B01D 67/0006; B01D 69/12; B01D 69/125; B01D 71/56; B01D 71/68; B01D 61/02; B01D 65/08; B01D 67/0002; B01D 2323/08; B01D 2325/04; Y02A 20/131; C02F 1/44; C02F 1/441
   USPC ...... 210/488–492, 500.21, 500.41, 505–509, 210/321.61, 321.75, 321.84
   See application file for complete search history.

(56) References Cited

U.S. PATENT DOCUMENTS

| | | |
|---|---|---|
| 8,506,807 B2 | 8/2013 | Lee et al. |
| 2002/0027111 A1 | 3/2002 | Ando et al. |
| 2002/0070158 A1 | 6/2002 | Buecher et al. |
| 2008/0032719 A1 | 2/2008 | Rosenberg |
| 2008/0185332 A1 | 8/2008 | Niu et al. |
| 2009/0200228 A1 | 8/2009 | Eisengräber et al. |
| 2010/0133183 A1 | 6/2010 | Theron et al. |
| 2014/0083066 A1 | 3/2014 | Bahukudumbi et al. |
| 2015/0014244 A1 | 1/2015 | Shimura et al. |
| 2015/0041388 A1 | 2/2015 | Hirozawa et al. |
| 2015/0144560 A1 | 5/2015 | Taniguchi et al. |
| 2017/0144110 A1 | 5/2017 | Shimura et al. |
| 2018/0133658 A1 | 5/2018 | Seo et al. |
| 2018/0264411 A1 | 9/2018 | Herron |
| 2019/0105208 A1 | 4/2019 | Saevecke et al. |
| 2019/0209968 A1 | 7/2019 | Hoz |
| 2019/0217286 A1 | 7/2019 | Miyamoto et al. |
| 2020/0040484 A1 | 2/2020 | Watanabe et al. |
| 2021/0291119 A1 | 9/2021 | Lee et al. |
| 2021/0322927 A1 | 10/2021 | Cho et al. |
| 2022/0011630 A1 | 1/2022 | Ko et al. |
| 2022/0387936 A1 | 12/2022 | Lee et al. |
| 2023/0008479 A1 | 1/2023 | Park et al. |

FOREIGN PATENT DOCUMENTS

| | | | |
|---|---|---|---|
| CN | 105694053 | | 6/2016 |
| CN | 105771672 | | 7/2016 |
| DE | 2020-15005969 | | 11/2015 |
| EP | 1044718 | | 10/2000 |
| JP | 11-009921 | | 1/1999 |
| JP | H 11-009921 | | 1/1999 |
| JP | 2000-354743 | | 12/2000 |
| JP | 2003-245530 | | 9/2003 |
| JP | 2004-041870 | | 2/2004 |
| JP | 2004-202409 | | 7/2004 |
| JP | 2007-111606 | | 5/2007 |
| JP | 2007-167783 | | 7/2007 |
| JP | 4103131 | | 6/2008 |
| JP | 2009-045595 | | 3/2009 |
| JP | 2009-149573 | | 7/2009 |
| JP | 2011-005455 | | 1/2011 |
| JP | 2014-083515 | | 5/2014 |
| JP | 2014-144441 | | 8/2014 |
| JP | 2017-000939 | | 1/2017 |
| JP | 2017-047417 | | 3/2017 |
| JP | 2017-119932 | | 7/2017 |
| JP | 2018-126706 | | 8/2018 |
| KR | 10-0169484 | | 10/1998 |
| KR | 10-0406735 | | 11/2003 |
| KR | 10-2006-0011043 | | 2/2006 |
| KR | 10-2009-0015087 | | 2/2009 |
| KR | 10-2010-0008213 | | 1/2010 |
| KR | 10-2011-0109387 | | 10/2011 |
| KR | 10-2012-0137890 | | 12/2012 |
| KR | 10-2013-0000477 | | 1/2013 |
| KR | 10-2014-0046952 | | 4/2014 |
| KR | 10-2014-0138651 | | 12/2014 |
| KR | 20140138651 A | * | 12/2014 |
| KR | 10-2015-0077062 | | 7/2015 |
| KR | 10-2015-0083048 | | 7/2015 |
| KR | 10-1541654 | | 8/2015 |
| KR | 10-2016-0037584 | | 4/2016 |
| KR | 10-2017-0103541 | | 9/2017 |
| KR | 10-2017-0112994 | | 10/2017 |
| KR | 10-2017-0126693 | | 11/2017 |
| KR | 10-1966114 | | 8/2019 |
| WO | WO 2013/058986 | | 4/2013 |
| WO | WO 2013/129610 | | 9/2013 |

OTHER PUBLICATIONS

Density Periodic Table—Periodic Table Wallpaper (Year: 2017).
Ramadan et al. "Review on Recent Applications of Antimicrobial Agents for Polyamide and Polypropylene." *Al-Azhar Bulletin of Science* (2012) 23.2-A: 1-28.
Royal Society of Chemistry, Antimony, Oct. 2019.

* cited by examiner

REVERSE OSMOSIS MEMBRANE AND METHOD FOR MANUFACTURING SAME

CROSS REFERENCE TO RELATED APPLICATIONS

This application is a national stage application under 35 U.S.C. § 371 of International Application No. PCT/KR2020/011114, filed internationally on Aug. 20, 2020, which claims priority to and the benefit of Korean Patent Application No. 10-2019-0114818, filed Sep. 18, 2019. The contents of the above patent applications are incorporated by reference herein in their entireties for all purposes.

TECHNICAL FIELD

The present invention relates to a reverse osmosis membrane and a method for manufacturing same, and more particularly to a high durability reverse osmosis membrane which is excellent in interlayer bonding in a separation membrane while maintaining an equal flow rate as compared with a conventional reverse osmosis membrane to minimize a reduction in durability in the membrane upon backwashing to enhance a cleaning effect, prolong the life of a high-pressure membrane, maximize the amount of accumulated treated water, and reduce maintenance costs, and a method for manufacturing same.

BACKGROUND ART

With the rapid increase of the global membrane filtration market and the development of membrane filtration technology, many membrane manufacturers and membrane engineers have appeared, and research on this is also increasing. This membrane filtration process can be classified into a low-pressure membrane filtration process operated at low pressure such as microfiltration (MF) and ultrafiltration (UF) and a high-pressure membrane filtration process operated at high pressure such as nanofiltration (NF) and reverse osmosis (RO), and recently, interest in the high-pressure membrane filtration process is rapidly increasing.

Meanwhile, in the separation membrane used in the membrane filtration process, phenomena such as organic fouling, inorganic fouling, particulate fouling, and biofouling occur depending on its use. As a result, its performance is continuously reduced. Therefore, in order to restore the permeability of the separation membrane, which has been reduced according to the operating time of the membrane filtration process, to an initial state, chemical washing (CIP, cleaning in place) is carried out using chemicals. Membrane contamination is divided into reversible membrane contamination and irreversible membrane contamination, and physical washing such as osmotic backwashing is carried out for reversible membrane contamination, and chemical washing is carried out for irreversible membrane contamination.

In the conventional reverse osmosis membrane, peeling of the polymer support layer frequently occurs during the operation of the osmosis process or the reverse osmosis backwashing process, and the peeling of the polymer support layer may accelerate the peeling of the active layer, and thus the salt rejection rate of the reverse osmosis membrane and the permeate flow rate is lowered, leading to a problem that the lifespan of the membrane is reduced.

[DETAILED DESCRIPTION OF THE INVENTION] [TECHNICAL PROBLEM]

The present invention has been made to solve the problems described above, and an object of the present invention is to provide a reverse osmosis membrane which is excellent in interlayer bonding in a separation membrane while maintaining the same flow rate as that of an existing reverse osmosis membrane, thereby minimizing the reduction in the durability of the membrane upon backwashing, enhancing the cleaning effect, extending the life of a high-pressure membrane, maximizing the cumulative throughput, and reducing maintenance costs.

Another object of the present invention is to provide a reverse osmosis membrane module having an excellent salt rejection rate, an excellent permeate flow rate and excellent durability even after osmotic backwashing, including the reverse osmosis membrane according to the present invention.

Means to Solve the Problem

In order to solve the above problems, in the reverse osmosis membrane of the present invention, a porous support, a polymer support layer, and a hydrophilic selective layer are sequentially laminated.

In a preferred embodiment of the present invention, the porous support may comprise a copolyester fiber in which an ester compound prepared by an esterification reaction of an acid component containing isophthalic acid (IPA) in an amount of 0.1 to 7 mol % and a diol component is polycondensed.

In a preferred embodiment of the present invention, the adhesive force between the porous support and the polymer support layer may be 20 to 1,100 gf/mm$^2$.

In a preferred embodiment of the present invention, the adhesive force between the porous support and the polymer support layer may be 500 to 1,100 gf/mm$^2$.

In a preferred embodiment of the present invention, the reverse osmosis membrane of the present invention may satisfy both the following Relational Formulas 1 and 2.

$$150 < B-A < 600 \quad \text{[Relational Formula 1]}$$

$$0.5 < B/A < 8 \quad \text{[Relational Formula 2]}$$

In Relational Formulas 1 and 2, A represents the adhesive force between the porous support and the polymer support layer, and B represents the adhesive force between the polymer support layer and the hydrophilic selective layer.

In a preferred embodiment of the present invention, the polymer support layer may comprise at least one selected from a polysulfone-based polymer compound, a polyamide-based polymer compound, a polyimide-based polymer compound, a polyester-based polymer compound, an olefin-based polymer compound, polyvinylidene fluoride, and polyacrylonitrile.

In a preferred embodiment of the present invention, the polymer support layer may comprise a polysulfone-based polymer compound represented by Chemical Formula 1 below.

[Chemical Formula 1]

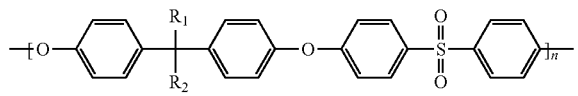

In Chemical Formula 1, $R_1$ and $R_2$ are each independently —H or a $C_1$ to $C_5$ alkyl group, and n is a rational number satisfying 10 to 1,130.

In a preferred embodiment of the present invention, the polymer support layer may have a thickness of 30 to 90 μm.

In a preferred embodiment of the present invention, the hydrophilic selective layer may comprise at least one selected from a polyamide-based polymer compound, a polypiperazine-based polymer compound, a polyphenylene diamine-based polymer compound, a polychlorophenylene diamine-based polymer compound, and a polybenzidine-based polymer compound.

In a preferred embodiment of the present invention, the porous support may be a fabric.

In a preferred embodiment of the present invention, the porous support may have an air permeability of 2 cc/cm²·sec or more, and an average pore diameter of 1 to 600 μm.

In a preferred embodiment of the present invention, the porous support may have a thickness of 20 to 150 μm.

In a preferred embodiment of the present invention, the hydrophilic selective layer may have a thickness of 0.1 to 1 μm.

Meanwhile, the method of preparing the reverse osmosis membrane of the present invention may comprise a first step of preparing a polymer solution comprising a polymer support layer-forming composition and a solvent; a second step of forming a polymer support layer by casting the polymer solution on one or both sides of the porous support; a third step of drying the porous support on which the polymer support layer is formed; and a fourth step of forming a hydrophilic selective layer on one side of the polymer support layer.

In a preferred embodiment of the present invention, the porous support in the method of preparing a reverse osmosis membrane of the present invention may comprise a copolyester fiber in which an ester compound prepared by an esterification reaction of an acid component containing isophthalic acid (IPA) in an amount of 0.1 to 7 mol % and a diol component is polycondensed.

In a preferred embodiment of the present invention, the adhesive force between the porous support and the polymer support layer in the method of preparing a reverse osmosis membrane of the present invention may be 20 to 1,100 gf/mm².

In a preferred embodiment of the present invention, the polymer solution in the method of preparing a reverse osmosis membrane of the present invention may contain 15 to 20 wt % of the polymer support layer-forming composition, based on the total wt %.

In a preferred embodiment of the present invention, the polymer support layer-forming composition in the method of preparing a reverse osmosis membrane of the present invention may comprise at least one selected from a polysulfone-based polymer compound, a polyamide-based polymer compound, a polyimide-based polymer compound, a polyester-based polymer compound, an olefin-based polymer compound, polyvinylidene fluoride, and polyacrylonitrile.

In a preferred embodiment of the present invention, the polymer support layer-forming composition in the method of preparing a reverse osmosis membrane of the present invention may comprise a polysulfone-based polymer compound represented by the following Chemical Formula 1.

[Chemical Formula 1]

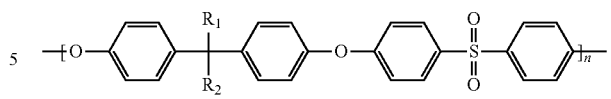

In Chemical Formula 1, $R_1$ and $R_2$ are each independently —H or a $C_1$ to $C_5$ alkyl group, and n is a rational number satisfying 10 to 1,130.

In a preferred embodiment of the present invention, the solvent in the method of preparing a reverse osmosis membrane of the present invention may comprise at least one selected from N-methyl-2-pyrrolidone (NMP), dimethylformamide (DMF), dimethyl sulfoxide (DMSO) and dimethylacetamide (DMAc).

In a preferred embodiment of the present invention, the polymer support layer in the method of preparing a reverse osmosis membrane of the present invention may be formed with a thickness of 30 to 90 μm.

In a preferred embodiment of the present invention, the hydrophilic selective layer in the method of preparing a reverse osmosis membrane of the present invention may be formed on side of a porous support layer by applying a polyfunctional amine-containing solution on one side of the porous support layer, and interfacial polymerization of the halogen compound-containing solution.

In a preferred embodiment of the present invention, the hydrophilic selective layer in the method of preparing a reverse osmosis membrane of the present invention may comprise a polyamide-based polymer compound formed by interfacial polymerization of a polyfunctional amine-containing solution and a polyfunctional halogen compound-containing solution.

In a preferred embodiment of the present invention, the polyfunctional amine in the method of preparing a reverse osmosis membrane of the present invention may comprise at least one selected from metaphenylenediamine, paraphenylenediamine, an aliphatic primary diamine, a cycloaliphatic primary diamine and a cycloaliphatic secondary amine.

In a preferred embodiment of the present invention, the polyfunctional halogen compound in the method of preparing a reverse osmosis membrane of the present invention may comprise at least one selected from trimesoyl chloride, isophthaloyl chloride and terephthaloyl chloride.

In a preferred embodiment of the present invention, the drying in step 3 of the method of preparing the reverse osmosis membrane of the present invention may be carried out at a temperature of 110 to 170° C. for 1 to 5 minutes.

Furthermore, the reverse osmosis membrane module of the present invention comprises the reverse osmosis membrane of the present invention.

Effects of the Invention

The reverse osmosis membrane of the present invention and method for manufacturing same can implement a reverse osmosis membrane having excellent membrane durability and an excellent lifespan while maintaining the same flow rate as that of existing reverse osmosis membranes, prevent the phenomenon that the polymer support layer is peeled off during osmotic backwashing by having excellent interlayer bonding in the separation membrane.

In addition, the reverse osmosis membrane of the present invention and the method for manufacturing same have a low salt rejection rate decrease and a low permeate flow rate increase rate.

In addition, the reverse osmosis membrane module including the reverse osmosis membrane of the present invention can minimize maintenance costs by maximizing the accumulated treatment amount.

MODES FOR CARRYING OUT THE INVENTION

Figure 1:
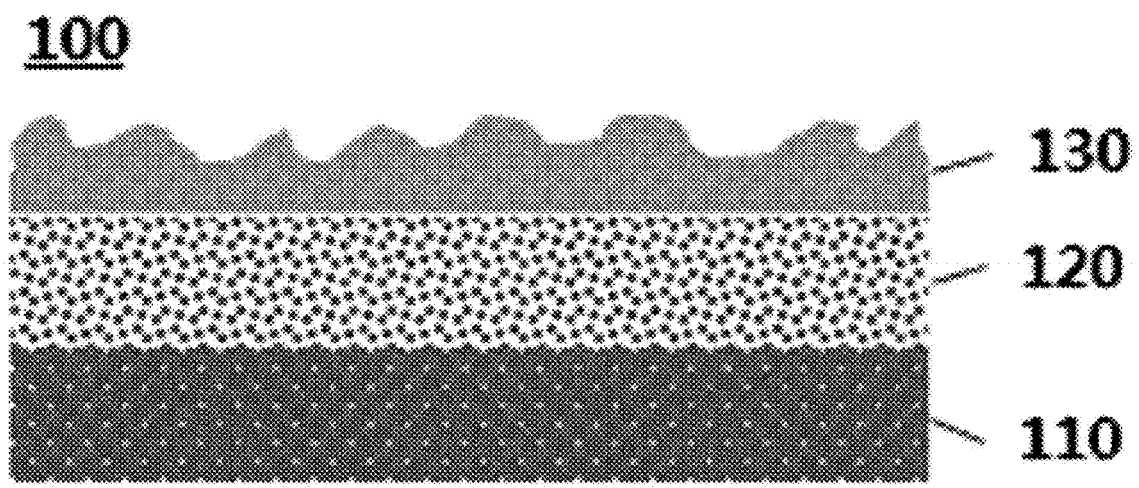
FIG. 1 shows a reverse osmosis membrane according to an embodiment of the present invention.

Hereinafter, embodiments of the present invention will be described in detail with reference to the accompanying drawings so as to be easily carried out by those skilled in the art. The present invention may be embodied in many different forms and is not limited to the embodiments set forth herein. In order to clearly illustrate the present invention in the drawings, portions that are not described are omitted, and the same reference numerals are added to the same or similar elements throughout the specification.

Conventional reverse osmosis membranes suffer from the problem that the separation of the polymer support layer frequently occurs during the operation of the osmotic process or the osmotic backwash process, and thus the hydrophilic selective layer formed on the polymer support layer is also separated, resulting in a significant reduction in the performance of the reverse osmosis membrane.

In order to solve the above-mentioned problems, the reverse osmosis membrane of the present invention has a certain range of adhesive force between the porous support and the polymer support layer, and therefore has excellent bonding force and can minimize a reduction in permeate flow rate.

In the present invention, the term "adhesive force" means the adhesive force between two media. For example, the force of adhesion between the porous support and the polymer support layer of the reverse osmosis membrane described in the present invention is referred to as "adhesive force."

The adhesive force was measured by lamination of a reverse osmosis membrane using a texture analyzer. Specifically, the force can be measured as a function of the distance when the separation membrane is laminated after attaching the reverse osmosis membrane to a tape and PET film and then pulling the PET film in the 180 degree direction at a constant speed.

In the reverse osmosis membrane of the present invention, a porous support, a polymer support layer, and a hydrophilic selective layer are sequentially laminated.

Specifically, referring to FIG. 1, the reverse osmosis membrane 100 of the present invention has a structure in which a porous support 110, a polymer support layer 120, and a hydrophilic selective layer 130 are sequentially stacked.

First, the porous support 110 of the present invention is not particularly limited as long as it serves as a support for a conventional reverse osmosis membrane, but may be preferably a fabric, more preferably a non-woven fabric.

Specifically, a fabric means a woven fabric, a knitted fabric, or a non-woven fabric, the fabric having vertical and horizontal directions when woven with warp and weft yarns, and the knitted fabric may have a direction in either the vertical or horizontal direction in a broad sense, although the specific direction may vary depending on the knitting method. In addition, the non-woven fabric does not have a vertical and horizontal direction unlike a woven or knitted fabric.

When the fabric is a woven fabric, the type, fineness, density of warp and weft yarns, texture of the fabric, and the like of the fibers forming the weft yarn can be adjusted to control the desired physical properties of the porous support 110, such as porosity, pore size, strength, and permeability.

In addition, when the fabric is a knitted fabric, properties such as porosity, pore size, strength, and permeability of the desired porous support 110 can be controlled by adjusting the type of fiber, fineness, knitted tissue, gauge, cut, etc. included in the knitted fabric.

In addition, when the fabric is a non-woven fabric, properties such as porosity, pore size, strength, and permeability of the desired porous support 110 can be adjusted by adjusting the type, fineness, fiber length, basis weight, density, etc. of fibers included in the non-woven fabric.

Meanwhile, a material of the porous support 110 of the present invention may typically serve as a porous support for reverse osmosis membranes, and the porous support of the present invention may include a copolyester fiber in which an ester compound prepared by esterification of an acid component including 0.1 to 7 mol %, preferably 0.1 to 4.5 mol %, more preferably 0.2 to 1.0 mol % of isophthalic acid (IPA) and a diol component is polycondensed. At this time, when the acid component contains more than 7 mol % of isophthalic acid, it may cause a decrease in the flow rate.

Meanwhile, the acid component of the porous support may include a carboxylic acid in addition to isophthalic acid, and the carboxylic acid may include at least one selected from an aromatic polycarboxylic acid having 6 to 14 carbon atoms and an aliphatic polycarboxylic acid having 2 to 16 carbon atoms.

The aromatic polycarboxylic acid having 6 to 14 carbon atoms of the present invention may contain at least one selected from terephthalic acid, dimethyl terephthalate and dimethyl isophthalate, and the aliphatic polycarboxylic acid having 2 to 16 carbon atoms may contain one or more selected from oxalic acid, malonic acid, succinic acid, glutaric acid, adipic acid, suberic acid, citric acid, pimelic acid, azelaic acid, sebacic acid, nonanoic acid, decanoic acid, dodecanoic acid and hexanodecanoic acid.

In addition, the diol component of the porous support may include at least one selected from ethylene glycol, diethylene glycol, 1,3-propanediol, 2-methyl-1,3-propanediol, 3-methyl-1,5-pentanediol, 1,4-butanediol, 1,6-hexanediol, propylene glycol, trimethyl glycol, tetramethylene glycol, pentamethyl glycol, hexamethylene glycol, heptamethylene glycol, octamethylene glycol, nonamethylene glycol, decamethylene glycol, undecamethylene glycol, dodecamethylene glycol and tridecamethylene glycol.

Furthermore, the porous support 110 of the present invention can control the physical properties of the membrane depending on porosity and hydrophilicity. As a non-limiting example, the porous support 110 of the present invention may have an air permeability of 2 cc/cm$^2$·sec or more, and preferably have an air permeability of 2-20 cc/cm$^2$·sec, and the average pore diameter of the porous support 110 may be between 1 and 600 µm, and preferably between 5 and 300 µm. When the air permeability and average pore diameter conditions of the porous support 110 are satisfied, smooth inflow of water and water permeability can be improved.

The porous support 110 may be made of a non-woven fabric having a multilayer structure based on a double structure of a back layer using coarse fibers and thin fibers. In addition, the porous support 110 may be a porous support 110, which is made of polymers having different melting points, and in which a low-melting-point polymer having a melting point that is 5 to 140° C. lower than the melting point of a high-melting-point polymer is disposed at the periphery of the high-melting-point polymer.

In addition, the thickness of the porous support 110 may be 20 to 150 µm, preferably 50 to 120 µm, more preferably 70 to 110 µm, and when the thickness is less than 20 µm, the strength of the entire membrane may be reduced, and when it exceeds 150 µm, it may cause a decrease in the flow rate.

Next, the polymer support layer 120 of the present invention is a general microporous support layer, and its type is not particularly limited, but it should generally be of a size sufficient to allow permeation of a permeate and not large enough to interfere with the crosslinking of the ultra-thin membrane formed thereon. In this case, the pore diameter of the porous support layer is preferably 1 to 500 nm, and when it exceeds 500 nm, the ultra-thin membrane is recessed into the pore diameter after the thin membrane is formed, and it may be difficult to achieve the required flat sheet structure.

The polymer support layer 120 of the present invention may include at least one selected from a polysulfone-based polymer compound, a polyamide-based polymer compound, a polyimide-based polymer compound, a polyester-based polymer compound, an olefin-based polymer compound, polyvinylidene fluoride, and polyacrylonitrile, preferably a polysulfone-based polymer compound, and more preferably a polysulfone-based polymer compound represented by the following Chemical Formula 1.

[Chemical Formula 1]

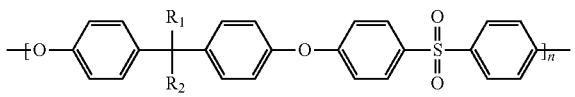

In Chemical Formula 1, $R_1$ and $R_2$ are each independently —H or a $C_1$-$C_5$ alkyl group, preferably a $C_1$-$C_3$ alkyl group.

In addition, in Chemical Formula 1, n is a rational number satisfying 10 to 1,130, and preferably, 140 to 340.

In addition, the polymer support layer 120 of the present invention may have a thickness of 30 to 90 µm, preferably 35 to 60 µm, more preferably 55 to 60 µm, and when the thickness is less than 30 µm, the bonding force between the polymer support layer 120 and the porous support 110 is not expressed at a desired level, so that the polymer support layer 120 can be peeled off from the porous supports 110 after backwash, and when the thickness exceeds 90 µm, the permeate flow rate of the reverse osmosis membrane can be lowered.

Finally, although the hydrophilic selective layer of the present invention can be used without limitation as long as it is a material that can be usually used as a hydrophilic selective layer of a reverse osmosis membrane in the art, it may preferably contain at least one selected from among polyamide-based polymer compounds, polypiperazine-based polymers, polyphenylene diamine-based polymers, polychlorophenylene diamine-based polymer compounds and polybenzidine-based polymer compounds, and more preferably contain polyamide-based polymer compounds.

In addition, the hydrophilic selective layer 130 of the present invention may have a thickness of 0.1 to 1 µm, preferably 0.1 to 0.5 µm, and when the thickness is less than 0.1 µm, the salt removal ability may be reduced, and when it exceeds 1 µm, the permeate flow rate of the reverse osmosis membrane may decrease.

Meanwhile, in the reverse osmosis membrane of the present invention, an adhesive force between the porous support and the polymer support layer may be 20 to 1100 gf/mm², preferably 500 to 1100, more preferably 800 to 900, still more preferably 840 to 900 gf/mm² and may have a problem of a decrease in the salt rejection rate and an increase in the permeate flow rate increase rate and a decrease in durability when the adhesive force is out of the above range.

In addition, in the reverse osmosis membrane of the present invention, an adhesive force between the polymer support layer and the hydrophilic selective layer may be 500 to 1,600 gf/mm², preferably 800 to 1,500 gf/mm² and more preferably 1,100 to 1,400 gf/mm², and still more preferably 1,200 to 1,350 gf/mm², and when the adhesive force is out of the above range, there may be a problem of a decrease in the salt rejection rate and an increase in the permeate flow rate increase rate, and a decrease in durability.

In addition, the reverse osmosis membrane of the present invention may satisfy both the following Relational Formulas 1 and 2.

$$150 < B-A < 600, \text{ preferably } 250 < B-A < 550, \text{ more preferably } 300 < B-A < 500, \text{ still more preferably } 350 < B-A < 450, \text{ even more preferably } 375 < B-A < 425$$ [Relational Formula 1]

$$0.5 < B/A < 8, \text{ preferably } 1.0 < B/A < 4, \text{ more preferably } 1.1 < B/A < 2, \text{ still more preferably } 1.3 < B/A < 1.6, \text{ even more preferably } 1.4 < B/A < 1.56$$ [Relational Formula 2]

In Relational Formulas 1 and 2, A represents the adhesive force between the porous support and the polymer support layer, and B represents the adhesive force between the polymer support layer and the hydrophilic selective layer.

When both Relational Formulas 1 and 2 are not satisfied, there may be a problem in that the salt rejection rate decrease value is high and the permeate flow rate increase rate increases.

Furthermore, the reverse osmosis membrane of the present invention may satisfy the following conditions (a) and (b) with respect to an aqueous 2,000 ppm sodium chloride solution at a temperature of 25° C. and a pressure of 225 psi, after being back-washed at a pressure of 3 bar, and through this, it can be confirmed that the reverse osmosis membrane of the present invention has excellent durability.

(a) 10% or less salt removal rate change rate
(b) 15% or less permeate flow rate change rate Meanwhile, the present invention includes a reverse osmosis membrane module including the above-mentioned reverse osmosis membrane.

The configuration of the reverse osmosis membrane module of the present invention may employ a configuration of a reverse osmosis module conventionally used in the art, for which, as a non-limiting example, the reverse osmosis membrane may be spirally wound on a porous permeate outlet pipe along with a spacer for flow path formation purposes and may include an end cap for shape stability of the separation membrane wound at both ends of the wound membrane.

Figure 3:
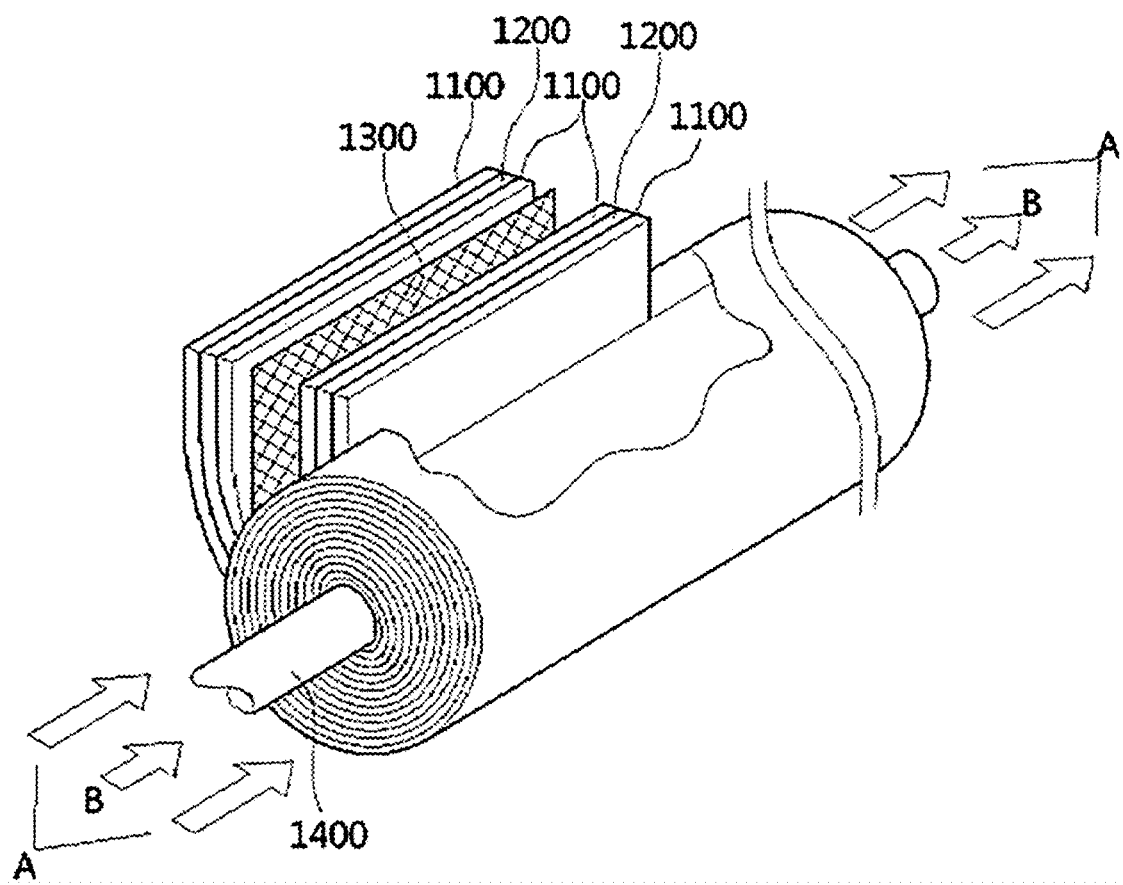
FIG. 3 is an exploded perspective view of a reverse osmosis membrane module according to an embodiment of the present invention.

FIG. 3 is an exploded perspective view of a reverse osmosis membrane module according to an embodiment of the present invention.

The size and shape of a pressure case may not be limited within an acceptable range of the reverse osmosis membrane module, but preferably the shape may be cylindrical because a plurality of filter assemblies are wound in a spiral shape. However, the shape of the pressure case is not limited thereto. The material of the pressure case may be used without limitation in the case of a pressure case material commonly used for a reverse osmosis membrane module in the art.

Referring to FIG. 3, the reverse osmosis separation membrane module 1000 includes a plurality of filter assemblies spirally wound around the outlet pipe 1400, and the cross-sectional diameter of the reverse osmosis membrane module may vary depending on the diameter of an outlet pipe, the number of assemblies, thickness, etc.

The outlet pipe 1400 has a plurality of holes, and the fluid flowing through the outlet pipe 1400 flows into the reverse osmosis membrane 1100 of the filter assembly through the holes. Specifically, the A solution of two solutions A and B having different concentrations flows into the inside of the pressure case and out of the reverse osmosis membrane 1100 of the filter assembly, and the B solution flows through the holes in the outlet pipe 1400 and into the reverse osmosis membrane 1100 of a filter assembly. Through this, the two solutions A and B having different concentrations are located inside and outside the reverse osmosis membrane 1100 of the filter assembly, thereby generating acting osmotic pressure. However, the two solutions A and B may be injected in the same direction as in FIG. 3, but this is an example, and alternatively, depending on the purpose, both solutions A and B can be injected in different directions.

The reverse osmosis membrane module may include an outer spacer 1300 between the plurality of filter assemblies and an inner spacer 1200 between the reverse osmosis membranes. The outer spacer 1300 and the inner spacer 1200 may form a flow path through which a fluid, e.g., solution A, flowing between different filter assemblies can smoothly flow as an inflow channel.

The material, shape, and size of the spacer and the end cap may employ the configuration of a spacer and an end cap conventionally used in a reverse osmosis membrane module in the art, so that specific description thereof is omitted.

The wound reverse osmosis membrane may be housed in an outer case, and the material, size, and shape of the outer case may also be those of an outer case commonly used in reverse osmosis modules in the art. In addition, the wound reverse osmosis membrane can be wrapped using a fiber reinforced plastic (FRP) rather than an outer case.

Furthermore, the method of preparing the reverse osmosis membrane of the present invention includes first to fourth steps.

First, in the first step of the method of preparing a reverse osmosis membrane of the present invention, a polymer solution including a polymer support layer-forming composition and a solvent may be prepared.

At this time, the polymer solution may contain 15 to 20 wt % of the polymer support layer-forming composition among the total weight percentage, preferably 17 to 20%, more preferably 17.1 to 17.8 wt %, and still more preferably, 17.2 to 17.4 wt %; and when the content of the polymer support layer-forming composition is less than 15 wt %, the polymer support layer of the reverse osmosis membrane may be peeled off after the backwash, and when it exceeds 20 wt %, the permeate flow rate and the salt rejection rate of the reverse osmosis membrane can be lowered, and the like, which may be difficult to achieve the object of the present invention.

In addition, the polymer support layer-forming composition of the present invention may include at least one selected from a polysulfone-based polymer compound, a polyamide-based polymer compound, a polyimide-based polymer compound, a polyester-based polymer compound, an olefin-based polymer compound, polyvinylidene fluoride, and polyacrylonitrile, preferably a polysulfone-based polymer compound, and more preferably a polysulfone-based polymer compound represented by the following Chemical Formula 1.

[Chemical Formula 1]

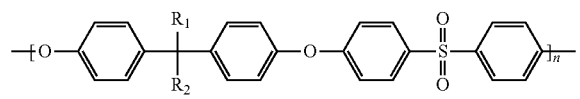

In Chemical Formula 1, $R_1$ and $R_2$ are each independently —H or a $C_1$-$C_5$ alkyl group, preferably a $C_1$-$C_3$ alkyl group.

In addition, in Chemical Formula 1, n is a rational number satisfying 10 to 1,130, and preferably, 130 to 340.

In addition, the solvent of the present invention may be used without any limitation as long as it is a solvent capable of dissolving the polymer support layer-forming composition, but it may preferably include at least one selected from N-methyl-2-pyrrolidone (NMP), dimethylformamide (DMF), dimethyl sulfoxide (DMSO) and dimethylacetamide (DMAc), and more preferably it may contain dimethylformamide (DMF).

In addition, the solvent of the present invention may be included at 80 to 85 wt %, preferably 80 to 83 wt %, more preferably 82.2 to 83% wt, still more preferably 82.6 to 83% wt, of the total wt % of the polymer solution, and when the solvent is included at less than 80 wt %, the viscosity of a polymer solution may be excessively increased to make it difficult to form a membrane, and when it exceeds 85 wt %, the strength of a reverse osmosis membrane may be lowered or the viscosity thereof may be very low, making it difficult to form a membrane.

In addition, when the polymer solution is prepared by mixing the polymer support layer-forming composition and the solvent, the temperature of the solvent may be 20 to 90° C., and when the solvent temperature is less than 20° C., the composition may not dissolve, whereas when it exceeds 90° C., it may be difficult to form a polymer support layer with a desired thickness because the viscosity of the solution is lowered.

Next, in the second step of the method for producing a reverse osmosis membrane of the present invention, the polymer solution prepared in the first step can be cast on one or both sides, preferably one side, of the porous support to form a polymer support layer.

The method for forming the polymer support layer in the second step can be used without limitation as long as it is a conventional method for treating a polymer solution used in forming a polymer support layer in the art, and as the method for casting the polymer solution, a coating method known in the technical field such as slot coating can be applied. The polymer solution can be cast on a porous support and then the solvent contained in the polymer solution is removed to form a polymer support layer, and as the method for removing the solvent, a phase inversion method in which a solvent and a non-solvent are substituted can be used, and specifically, the non-solvent may be at least any one selected from water, ethanol and methanol, but may vary depending on the components of the solvent.

In addition, the solvent contained in the polymer solution was removed to form the polymer support layer on one or both sides of the porous support, and the thickness of the formed polymer support layer may be 30 to 90 μm, preferably 35 to 60 μm, more preferably 55 to 60 μm in order to realize excellent durability of the polymer support layer without lowering the permeate flow rate and the salt rejection rate of the reverse osmosis membrane, and when the thickness is less than 30 μm, the bonding force between the polymer support layer and the porous supporting layer is not expressed at a desired level such that the polymer support layer may be peeled off from the porous supports after backwashing, and when the thickness exceeds 90 m, the permeate flow rate of the reverse osmosis membrane may be lowered.

The porous support in the second step is not particularly limited as long as it serves as a support for the reverse osmosis membrane, but may be preferably a fabric, more preferably a non-woven fabric.

In addition, a material of the porous support in the second step may typically serve as a porous support for reverse osmosis membranes, and the porous support of the present invention may include a copolyester fiber in which an ester compound prepared by esterification of an acid component including 0.1 to 7 mol %, preferably 0.1 to 4.5 mol %, more preferably 0.2 to 1.0 mol % of isophthalic acid (IPA) and a diol component is polycondensed. At this time, when the acid component contains more than 7 mol % of isophthalic acid, it may cause a decrease in the flow rate.

Furthermore, in the porous support of the second step, the physical properties of the membrane may be controlled according to porosity and hydrophilicity. As a non-limiting example, the porous support 110 of the present invention may have an air permeability of 2 $cc/cm^2 \cdot sec$ or more, and preferably have an air permeability of 2-20 $cc/cm^2 \cdot sec$, and the average pore diameter of the porous support may be between 1 and 600 μm, and preferably between 5 and 300 μm. When the air permeability and average pore diameter conditions of the porous support are satisfied, smooth inflow of water and water permeability can be improved.

In addition, the porous support of the second step may be made of a non-woven fabric having a multilayer structure based on a double structure of a back layer using coarse fibers and thin fibers. In addition, the porous support may be a porous support, which is made of polymers having different melting points, and in which a low-melting-point polymer having a melting point that is 5 to 140° C. lower than the melting point of a high-melting-point polymer is disposed at the periphery of the high-melting-point polymer.

Next, in the third step of the method of preparing the reverse osmosis membrane of the present invention, the porous support on which the polymer support layer is formed may be dried.

At this time, the drying may be carried out at a temperature of 110 to 170° C., preferably 120 to 150° C., more preferably 120 to 135° C. for 1 to 5 minutes, preferably 2 to 4 minutes, and when the temperature is less than 110, there may be a problem with adhesive force, and when it exceeds 170° C., there may be a problem in water permeability.

Finally, in the fourth step of the method of preparing a reverse osmosis membrane of the present invention, a hydrophilic selective layer may be formed on one side of the polymer support layer formed in the second step.

Specifically, although the hydrophilic selective layer can be used without limitation as long as it is a material that can be typically used as a hydrophilic selective layer of a reverse osmosis membrane in the art, it may preferably include at least one selected from among polyamide-based polymer compounds, polypiperazine-based polymers, polyphenylene diamine-based polymers, polychlorophenylene diamine-based polymer compounds and polybenzidine-based polymer compounds, and more preferably contain polyamide-based polymer compounds.

The method for forming the hydrophilic selective layer may vary depending on the type of material included in the selected hydrophilic selective layer, but the method may be based on a conventional method of forming the hydrophilic selective layer according to the type of material.

As an example, the hydrophilic selective layer may be formed on one side of the porous support layer by applying a polyfunctional amine-containing solution onto one side thereof and interfacial polymerization of the halogen compound-containing solutions.

As a specific example, the hydrophilic selective layer may include a polyamide-based polymer compound formed by interfacial polymerization of a polyfunctional amine-containing solution and a polyfunctional halogen compound-containing solution.

Specifically, a hydrophilic selective layer containing a polyamide-based polymer compound can be formed by immersing a porous support having a polymer support layer formed on one side or both surfaces thereof in a solution containing a polyfunctional amine, and then immersing the porous support in the solution containing the polyfunctional halogen compound to carry out interfacial polymerization.

The polyfunctional amine is a material having 2 to 3 amine functional groups per monomer, and may be a polyamine including a primary amine or a secondary amine. In this case, as the polyamine, metaphenylenediamine, paraphenylenediamine, orthophenyldiamine, and an aromatic primary diamine as a substituent may be used, and as another example, an aliphatic primary diamine, a cycloaliphatic primary diamine such as cyclohexenediamine, a cycloaliphatic secondary amine such as piperazine, an aromatic secondary amine, and the like can be used. More preferably, among the polyfunctional amines, metaphenylenediamine can be used, the concentration of which is preferably in the form of an aqueous solution containing 0.5 to 10 wt % of metaphenylenediamine, more preferably 1 to 4 wt %, even more preferably 1.5 to 2.5 wt % may be included, with the advantage that a further improved permeate flow rate can be achieved.

In addition, when the porous support having a polymer support layer formed on one side or both sides is immersed in a solution containing a polyfunctional amine, the immersion time may be 0.1 to 10 minutes, more preferably 0.5 to 1 minute.

In addition, the polyfunctional halogen compound may preferably include a polyfunctional acyl halide, more preferably at least one selected from trimesoyl chloride, isophthaloyl chloride, 5-methoxy-1,3-isophthaloyl chloride and terephthaloyl chloride.

The polyfunctional acyl halide can be dissolved at 0.01 to 2 wt % in an aliphatic hydrocarbon solvent, wherein as the aliphatic hydrocarbon solvent, a mixture of an n-alkane having 5 to 12 carbon atoms and structural isomers of saturated or unsaturated hydrocarbons having 8 carbon atoms may be used, or a cyclic hydrocarbon having from 5 to 7 carbon atoms may be used. Preferably, the polyfunctional acyl halide-containing solution may be dissolved in an aliphatic hydrocarbon solvent in an amount of 0.01 to 2 wt %, more preferably 0.05 to 0.3 wt %.

In this case, the interfacial polymerization can be carried out by immersing the porous support having the polymer support layer formed on one or both sides of the porous support in the polyfunctional halogen compound-containing solution for 0.1 to 10 minutes, more preferably 0.5 to 1 minute.

Meanwhile, the thickness of the hydrophilic selective layer formed through the third step of the method for preparing a reverse osmosis membrane of the present invention may be 0.1 to 1 µm, preferably 0.1 to 0.5 µm, and when the thickness is less than 0.1 µm, the salt removal capability may decrease, and when it exceeds 1 µm, the permeate flow rate of the reverse osmosis membrane may decrease.

Furthermore, in the reverse osmosis membrane prepared through the method of preparing the reverse osmosis membrane of the present invention, an adhesive force between the porous support and the polymer support layer may be 20 to 1,100 gf/mm², preferably 500 to 1,100 gf/mm², more preferably 800 to 900 gf/mm², and still more preferably 840 to 900 gf/mm², and when it is out of the range of the adhesive force, the salt rejection rate decrease value and the permeate flow rate increase rate increase, and there may be a problem of lowered durability.

In addition, in the reverse osmosis membrane prepared through the method of preparing a reverse osmosis membrane of the present invention, an adhesive force between the polymer support layer and the hydrophilic selective layer may be 500 to 1,600 gf/mm², preferably 800 to 1,500 gf/mm², more preferably 1,100 to 1,400 gf/mm², and even more preferably 1,200 to 1,350 gf/mm², and when it is out of the range of the adhesive force, the salt rejection rate decrease value and the permeate flow rate increase rate increase, and there may be a problem of lowered durability.

In addition, the reverse osmosis membrane prepared through the method of preparing the reverse osmosis membrane of the present invention may satisfy both the following Relational Formulas 1 and 2.

$150 < B-A < 600$, preferably $250 < B-A < 550$, more preferably $300 < B-A < 500$, still more preferably $350 < B-A < 450$, even more preferably $375 < B-A < 425$ [Relational Formula 1]

$0.5 < B/A < 8$, preferably $1.0 < B/A < 4$, more preferably $1.1 < B/A < 2$, still more preferably $1.3 < B/A < 1.6$, even more preferably $1.4 < B/A < 1.56$ [Relational Formula 2]

In Relational Formulas 1 and 2, A represents the adhesive force between the porous support and the polymer support layer, and B represents the adhesive force between the polymer support layer and the hydrophilic selective layer.

When both Relational Formulas 1 and 2 are not satisfied, there may be a problem in that the salt rejection rate reduction value is high and the permeate flow rate increase rate increases.

While the present invention has been described with reference to embodiments, it will be understood by those skilled in the art that these are merely exemplary and do not limit the embodiments of the invention, and that various modifications and applications not exemplified above can be made without departing from the essential characteristics of the present invention. For example, each component specifically shown in the embodiments of the present invention may be modified. Also, the differences associated with such modifications and applications should be interpreted as being within the scope of the invention as defined by the appended claims.

Comparative Example 1: Preparation of Reverse Osmosis Membrane (1) A polymer solution was prepared by mixing a polysulfone-based polymer compound represented by the following Chemical Formula 1-1 and dimethylformamide (DMF) as a solvent.

At this time, the polymer solution was prepared by mixing 17.3 wt % of a polysulfone-based polymer compound represented by the following Chemical Formula 1-1 and 82.7 wt % of dimethylformamide (DMF), based on the total wt %.

[Chemical Formula 1-1]

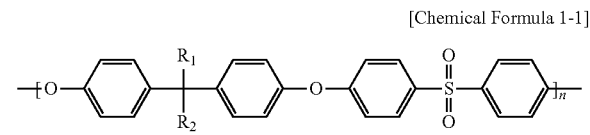

In Chemical Formula 1-1, $R_1$ and $R_2$ are methyl groups, and n is 235.

(2) A non-woven fabric (polyester-based synthetic fiber, thickness: 90 µm) was prepared as a porous support, and the prepared polymer solution was cast on one side of the prepared non-woven fabric at a temperature of 25° C. for 3 minutes to form a polymer support layer having an average thickness of 57.5 µm.

(3) The porous support on which the polymer support layer was formed was immersed in an aqueous solution containing 2.0 wt % of m-phenylenediamine for 1 minute, and after removing water on the surface by a compression method, the porous support was subjected to interfacial polymerization by immersion in an organic solution containing 0.1 wt % of trimesoyl chloride. Then, it was naturally dried at room temperature (25° C.) for 1 minute and 30 seconds to form a hydrophilic selective layer composed of a polyamide-based polymer compound with an average thickness of 0.3 µm on one side of the polymer support layer.

(4) Then, in order to remove unreacted residues, the porous support on which the hydrophilic selective layer and the polymer support layer were formed was immersed in a solution containing 0.2 wt % of sodium carbonate for 2 hours to prepare a reverse osmosis membrane.

Comparative Examples 2 to 12: Preparation of Reverse Osmosis Membrane

A reverse osmosis membrane was prepared in the same manner as in Comparative Example 1. However, at the time of preparing the polymer solution, as shown in Table 1 below, the mixing ratio of the polysulfone-based polymer compound represented by the above Chemical Formula 1-1 and dimethylformamide (DMF) as a solvent was varied.

In addition, a reverse osmosis membrane was prepared by varying the thickness of the formed polymer support layer as shown in Table 1 below.

Example 1: Preparation of Reverse Osmosis Membrane (1) A polymer solution was prepared by mixing a polysulfone-based polymer compound represented by the following Chemical Formula 1-1 and dimethylformamide (DMF) as a solvent.

At this time, the polymer solution was prepared by mixing 17.3 wt % of a polysulfone-based polymer compound represented by the following Chemical Formula 1-1 and 82.7 wt % of dimethylformamide (DMF), based on the total wt %.

[Chemical Formula 1-1]

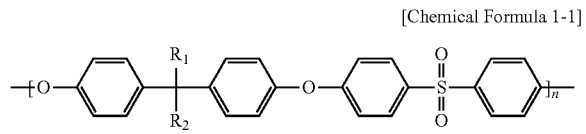

In Chemical Formula 1-1, $R_1$ and $R_2$ are methyl groups, and n is 235.

(2) A non-woven fabric (polyester-based synthetic fiber, thickness: 90 μm) containing isophthalic acid (IPA) in an amount of 0.3 mol % was prepared as a porous support, and the prepared polymer solution was cast on one side of the prepared non-woven fabric at a temperature of 25° C. for 3 minutes to form a polymer support layer having an average thickness of 57.5 μm.

(3) The porous support on which the polymer support layer was formed was dried at a temperature of 130° C. for 2 minutes.

(4) After drying, the porous support on which the polymer support layer was formed was immersed in an aqueous solution containing 2.0 wt % of m-phenylenediamine for 1 minute, and after removing water on the surface by a compression method, it was immersed in an organic solution containing 0.1 wt % of trimesoyl chloride for 1 min to carry out interfacial polymerization. Then, it was naturally dried at room temperature (25° C.) for 1 minute and 30 seconds to form a hydrophilic selective layer composed of a polyamide-based polymer compound with an average thickness of 0.3 μm on one side of the polymer support layer.

(5) Then, in order to remove unreacted residues, the porous support on which the hydrophilic selective layer and the polymer support layer were formed was immersed in a solution containing 0.2 wt % of sodium carbonate for 2 hours to prepare a reverse osmosis membrane.

Example 2: Preparation of Reverse Osmosis Membrane

A reverse osmosis membrane was prepared in the same manner as in Example 1. However, the drying in step (3) was carried out at a temperature of 150° C. for 2 minutes to prepare a reverse osmosis membrane.

Example 3: Preparation of Reverse Osmosis Membrane

A reverse osmosis membrane was prepared in the same manner as in Example 1. However, a reverse osmosis membrane was prepared using, as a porous support, a non-woven fabric (polyester-based synthetic fiber, thickness: 90 μm) including 2.0 mol % isophthalic acid (IPA) rather than the non-woven fabric including 0.3 mol % of isophthalic acid.

Example 4: Preparation of Reverse Osmosis Membrane

A reverse osmosis membrane was prepared in the same manner as in Example 1. However, a reverse osmosis membrane was prepared using, as a porous support, a non-woven fabric (polyester-based synthetic fiber, thickness: 90 μm) containing 4.0 mol % of isophthalic acid (IPA) rather than the non (non-woven) fabric containing 0.3 mol % isophthalic acid ("IPA") prepared in Example 1.

Example 5: Preparation of Reverse Osmosis Membrane

A reverse osmosis membrane was prepared in the same manner as in Example 1. However, a reverse osmosis membrane was prepared using, as a porous support, a non-woven fabric (polyester-based synthetic fiber, thickness: 90 μm) containing 6.0 mol % of isophthalic acid (IPA) rather than the non (non-woven) fabric containing 0.3 mol % isophthalic acid ("IPA") prepared in Example 1.

Experimental Example 1

In order to evaluate the peeling stability of the reverse osmosis membranes produced in Examples 1 to 5 and Comparative Examples 1 to 12, an adhesive strength evaluation was performed before the evaluation of the initial performance of a reverse osmosis membrane and the results are shown in the following Tables 1 and 3.

The adhesive force was measured by lamination of a reverse osmosis membrane using a texture analyzer. Specifically, the force can be measured as a function of the distance when the separation membrane is laminated after attaching the reverse osmosis membrane to a tape and a PET film and then pulling the PET film in the 180 degree direction at a constant speed.

Experimental Example 2

After evaluation of the initial performance of the reverse osmosis membranes prepared in Examples 1 to 5 and Comparative Examples 1 to 12, the performance after backwash of reverse osmosis membrane was evaluated to evaluate the peeling stability of the reverse osmosis membrane and the results are shown in Tables 2 and 4.

In the evaluation of the initial performance of the reverse osmosis membrane, an aqueous 2,000 ppm sodium chloride solution (25° C., 225 psi) was fed onto the hydrophilic selective layer of the reverse osmosis membrane to measure the flow rate of the produced water on the opposite side of the reverse osmosis membrane, which was then converted into a flow rate per unit area and unit pressure.

The salt rejection rate was obtained through Calculation Equation 1 below by measuring an ionic conductivity value (TDS: Total Dissolved Solids) of the produced water.

Salt rejection rate (%)={1−(Conductivity Value of Produced Water/Conductivity Value of Raw Water)}×100    [Calculation Equation 1]

In addition, the performance evaluation after backwash of the reverse osmosis membrane re-measured the flow rate and salt rejection rate after operating at a pressure of 3 bar (43.5 psi) for 20 minutes.

TABLE 1

| Item | Chemical Formula 1-1 (wt %) | Solvent (wt %) | Chemical Formula 1-1 (wt %) | Adhesive Force Between Porous Support And Polymer Support Layer (gf) | Adhesive Force Between Polymer Support Layer And Hydrophilic Selective Layer (gf) |
|---|---|---|---|---|---|
| Comp. Ex. 1 | 17.3 | 82.7 | 57.5 | 603 | 1,050 |
| Comp. Ex. 2 | 17.5 | 82.5 | 57.5 | 803 | 1,112 |
| Comp. Ex. 3 | 18 | 82.0 | 57.5 | 832 | 1,130 |
| Comp. Ex. 4 | 19 | 81.0 | 57.5 | 835 | 1,135 |
| Comp. Ex. 5 | 17 | 83.0 | 57.5 | 232 | 685 |
| Comp. Ex. 6 | 16.7 | 83.3 | 57.5 | 41 | 220 |
| Comp. Ex. 7 | 15.7 | 84.3 | 57.5 | 28 | 220 |
| Comp. Ex. 8 | 17.5 | 82.5 | 32.5 | 33 | 225 |
| Comp. Ex. 9 | 17.3 | 82.7 | 32.5 | 45 | 198 |
| Comp. Ex. 10 | 17 | 17 | 32.5 | 45 | 220 |
| Comp. Ex. 11 | 16.5 | 16.5 | 32.5 | 28 | 228 |
| Comp. Ex. 12 | 15.7 | 15.7 | 32.5 | 18 | 223 |

Comp. Ex.: Comparative Example

TABLE 2

| | Initial Performance | | Performance After Backwashing | | Increase | |
|---|---|---|---|---|---|---|
| Item | Salt rejection rate (%) | Permeate flow rate (GFD) | Salt rejection rate (%) | Permeate flow rate (GFD) | Decrease in Salt rejection rate | in Permeate flow rate (%) |
| Comp. Ex. 1 | 96.6 | 27.7 | 88.5 | 31.3 | 8.1 | 13.0 |
| Comp. Ex. 2 | 97.3 | 24.2 | 89.2 | 28.3 | 8.1 | 17.1 |
| Comp. Ex. 3 | 96.9 | 22.2 | 88.4 | 28.8 | 8.5 | 29.7 |
| Comp. Ex. 4 | 97.1 | 21.5 | 87.5 | 27.9 | 9.6 | 29.8 |
| Comp. Ex. 5 | 96.5 | 27.6 | 84.5 | 35.7 | 12 | 29.3 |
| Comp. Ex. 6 | 96.2 | 38.5 | 81.9 | 36.9 | 14.3 | 29.5 |
| Comp. Ex. 7 | 97.1 | 28.3 | 82.5 | 37.5 | 14.6 | 32.5 |
| Comp. Ex. 8 | 97.2 | 26.7 | 75.1 | 37.6 | 22.1 | 40.8 |
| Comp. Ex. 9 | 97.1 | 26.8 | 75.3 | 37.5 | 21.8 | 39.9 |
| Comp. Ex. 10 | 96.8 | 26.4 | 74.5 | 38.1 | 22.3 | 44.3 |
| Comp. Ex. 11 | 96.5 | 27.6 | 73.7 | 38.9 | 22.8 | 40.9 |
| Comp. Ex. 12 | 96.9 | 28.8 | 73.2 | 40.0 | 23.7 | 38.9 |

Comp. Ex.: Comparative Example

Referring to Tables 1 and 2 above, in Comparative Examples 8 to 12 in which the polymer support layer thickness is low, the salt rejection rate after the backwash is significantly decreased, and the permeate flow rate is significantly increased, and thus, it is determined that the polymer support layer is peeled off during the backwash.

In addition, it was confirmed that the reverse osmosis membrane produced in Comparative Example 1 among those produced in Comparative Examples 1 to 7 had the lowest salt rejection reduction value and the lowest permeate flow rate increase rate.

TABLE 3

| Item | IPA Content (mol %) | Drying temperature (° C.) | Chemical Formula 1-1 (wt %) | Solvent (wt %) | Average Thickness Of Polymer Support Layer (μm) | Adhesive Force Between Porous Support And Polymer Support Layer (gf/mm$^2$) | Adhesive Force Between Polymer Support Layer And Hydrophilic Selective Layer (gf/mm$^2$) |
|---|---|---|---|---|---|---|---|
| Ex. 1 | 0.3 | 130 | 17.3 | 82.7 | 57.5 | 844 | 1,250 |
| Ex. 2 | 0.3 | 150 | 17.3 | 82.7 | 57.5 | 849 | 1,210 |
| Ex. 3 | 2.0 | 130 | 17.3 | 82.7 | 57.5 | 833 | 1,150 |
| Ex. 4 | 4.0 | 130 | 17.3 | 82.7 | 57.5 | 837 | 1,110 |
| Ex. 5 | 6.0 | 130 | 17.3 | 82.7 | 57.5 | 835 | 1,050 |

Ex.: Example

TABLE 4

| Item | Initial Performance | | Performance After Backwashing | | Decrease in Salt rejection rate | Increase in Permeate flow rate (%) |
|---|---|---|---|---|---|---|
| | Salt rejection rate (%) | Permeate flow rate (GFD) | Salt rejection rate (%) | Permeate flow rate (GFD) | | |
| Ex. 1 | 97.2 | 26.2 | 89.8 | 28.9 | 7.4 | 10.3 |
| Ex. 2 | 97 | 26.4 | 89.5 | 29.1 | 7.5 | 10.2 |
| Ex. 3 | 96.5 | 24.3 | 87.3 | 27.3 | 9.2 | 12.3 |
| Ex. 4 | 96.3 | 24.1 | 86.7 | 27.2 | 9.6 | 12.9 |
| Ex. 5 | 96.4 | 24.5 | 86.1 | 28.2 | 10.3 | 15.1 |

Ex.: Example

Referring to Tables 1 to 4 above, in Example 1, it is determined that the peeling stability of the polymer support layer is remarkably excellent because the reduction in the salt rejection rate and the increase in the maximum flow rate are lower than those in Comparative Example 1.

In addition, it was confirmed that the reverse osmosis membranes produced in Example 1 among those produced in Examples 1 to 5 had the lowest salt rejection reduction value and the lowest permeate flow rate increase rate.

Experimental Example 3

A cross-sectional SEM image of the reverse osmosis membrane produced in Example 1 showing the best effect was taken.

Figure 2:
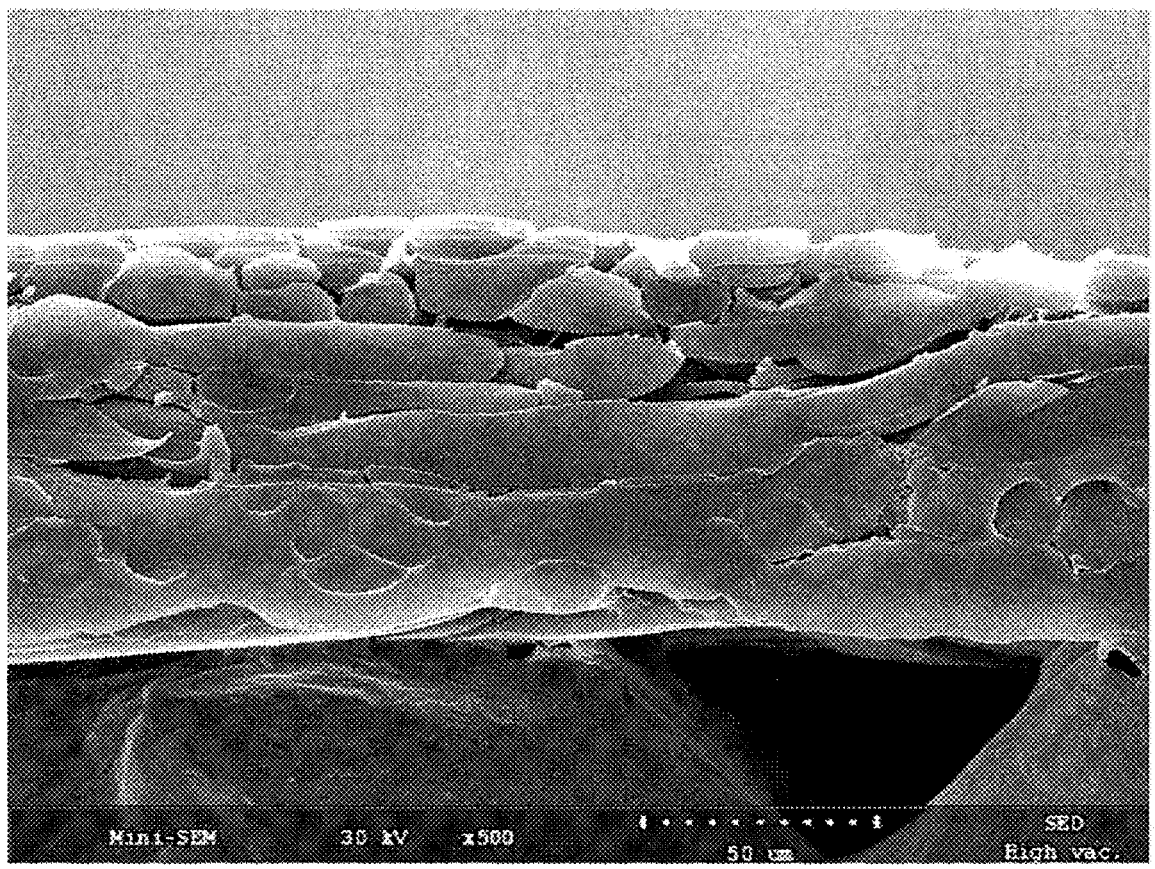
FIG. 2 is a cross-sectional SEM photograph of a reverse osmosis membrane prepared according to Example 1.

FIG. 2 is a cross-sectional SEM image of the reverse osmosis membrane produced in Example 1, and referring to FIG. 2, it can be confirmed that the polymer support layer is formed over the top surface and the inside of the porous support, whereby it is judged that the bonding force with the porous support is excellent, and since the polymer support layer has a flat shape and thus the peeling stability of the polymer support layer is excellent, it is determined that a reverse osmosis membrane with improved durability can be implemented.

Simple modifications and variations of the present invention may be readily made by those skilled in the art, and all such modifications or variations are deemed to be within the scope of the invention.

INDUSTRIAL APPLICABILITY

The present invention relates to a reverse osmosis membrane and a method for manufacturing same, and more particularly to a high durability reverse osmosis membrane which is excellent in interlayer bonding in a separation membrane while maintaining an equal flow rate as compared with a conventional reverse osmosis membrane to minimize a reduction in durability in the membrane upon backwashing to enhance a cleaning effect, prolong the life of a high-pressure membrane, maximize the amount of accumulated treated water, and reduce maintenance costs, and a method for manufacturing same.

What is claimed is:

1. A reverse osmosis membrane in which a porous support, a polymer support layer and a hydrophilic selective layer are sequentially stacked,
   the porous support comprises a copolyester fiber in which an ester compound prepared by an esterification reaction of an acid component containing isophthalic acid (IPA) in an amount of 0.1 to 7 mol % and a diol component is polycondensed, and
   an adhesive force between the porous support and the polymer support layer is 500 to 1,100 gf/mm$^2$, wherein:
   the reverse osmosis membrane satisfies both of the following Relational Formulas 1 and 2:

$$250 < B-A < 550 \quad \text{[Relational Formula 1]}$$

$$1.1 < B/A < 2; \quad \text{[Relational Formula 2]}$$

in Relational Formulas 1 and 2, A represents the adhesive force between the porous support and the polymer support layer, and B represents an adhesive force between the polymer support layer and the hydrophilic selective layer,
   the polymer support layer has a thickness of 30 to 90 μm and comprises a polysulfone-based polymer compound represented by the following Chemical Formula 1:

[Chemical Formula 1]

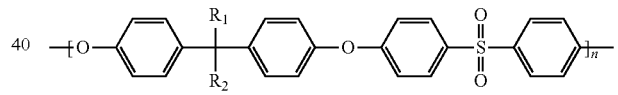

in Chemical Formula 1, R$_1$ and R$_2$ are each independently —H or a C$_1$ to C$_5$ alkyl group, and n is a rational number satisfying 10 to 1,130, and
   the hydrophilic selective layer comprises a polyamide-based polymer compound.

* * * * *